Dec. 13, 1932.　　　E. A. FLAKE　　　1,890,577
GLARE SHIELD
Filed June 21, 1932
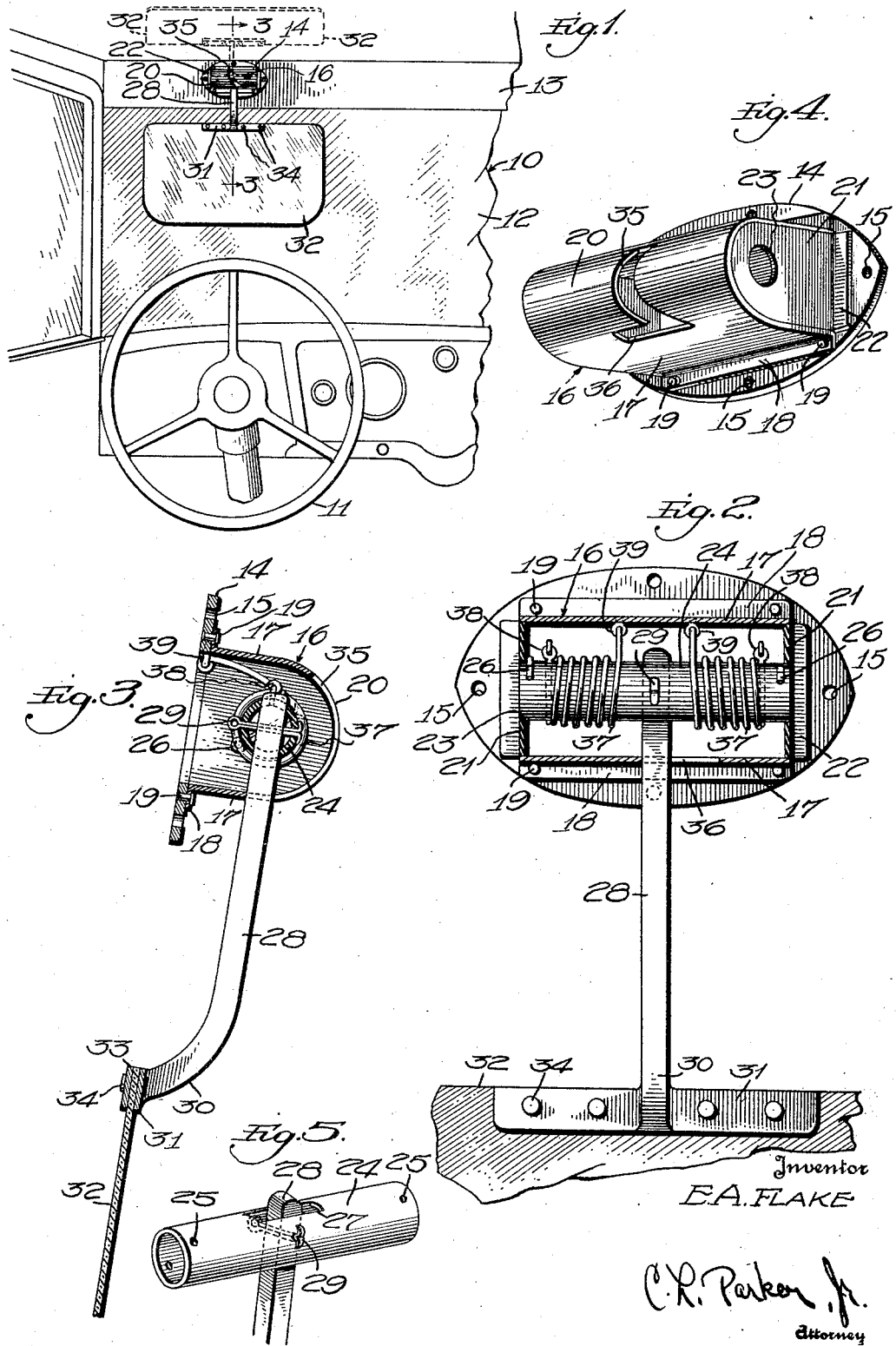
Inventor
E. A. FLAKE Patented Dec. 13, 1932

1,890,577

UNITED STATES PATENT OFFICE

EUGENE A. FLAKE, OF MARSHALL, MISSOURI

GLARE SHIELD

Application filed June 21, 1932. Serial No. 618,544.

This invention relates to glare shields for motor vehicles.

An important object of the invention is to provide a novel form of easily operated shield for use with motor vehicles for dimming the brilliant rays of the sun and the lights of vehicles approaching in the opposite direction.

A further object is to provide a glare shield structure having a shield element readily movable between operative and inoperative positions and having a normal bias to inoperative position so as to hold it out of the line of vision of the operator when its use is not desired.

A further object is to provide a device of the character referred to wherein the shield element is mounted upon a shaft to turn therewith and wherein a torsion spring is employed to tend to turn the shaft to a position with the glare shield out of the line of vision of the operator, means being provided for holding the shield in operative position against the tension of the spring, when desired.

A further object is to provide means for frictionally holding the shield element in operative position and to utilize the force of the torsion spring for increasing the frictional resistance to the movement of the shield from operative position.

A further object is to provide a shield of the character referred to wherein the movement of the shield between operative and inoperative positions is accomplished with slight effort on the part of the operator.

Other objects and advantages of the invention will become apparent during the course of the following description.

In the drawing I have shown one embodiment of the invention. In this showing:

Figure 1 is a fragmentary perspective view of the interior of the driver's compartment of a motor vehicle, Figure 2 is an enlarged face view of the device, parts being broken away and the casing being shown in section, Figure 3 is an enlarged sectional view taken substantially on line 3—3 of Figure 1, Figure 4 is an enlarged perspective view of the casing and bracket, and, Figure 5 is a detail perspective view of the shaft and a portion of the swinging arm.

Referring to Figure 1, the numeral 10 designates a motor vehicle as a whole in the driver's compartment of which is arranged the usual steering wheel 11. The usual windshield 12 is mounted forwardly of the steering wheel, and the windshield is surmounted by a head board 13.

A bracket plate 14 is provided with openings 15 to receive fastening elements by means of which the plate 14 may be secured to the head board 13 as shown in Figure 1. A casing indicated as a whole by the numeral 16 is arranged against the face of the plate 14. The casing 16 includes parallel top and bottom walls 17 flanged at their edges as at 18 to receive rivets 19 or other fastening elements to secure the casing to the plate 14. The walls 17 are connected by an inwardly extending substantially semi-cylindrical wall 20 forming a continuation of the walls 17.

The casing 16 is closed by end walls 21 which may be flanged as at 22 for connection with the plate 14 by soldering, riveting or any other suitable means. The end walls 21 correspond in shape and size to the walls 17 and 20 and are received in the end portions thereof as shown in Figures 2 and 4. The end walls are provided with openings 23 preferably formed concentric with the semi-cylindrical wall 20. A shaft 24 is mounted with its ends in the openings 23. This shaft is preferably formed of tubular stock cut to the desired length. Inwardly of each end wall 21, the tubular shaft is provided with openings 25 to receive cotter pins 26 which contact with the end walls to prevent endwise movement of the shaft, but it will be apparent that the shaft is free to rotate in the openings 23.

As shown in Figure 5, the shaft 24 is provided with longitudinally elongated diametrically opposite openings 27 in which is arranged one end of a swinging arm 28. This arm is pivotally connected to the shaft by a cotter pin or other suitable pivot means 29 whereby the arm is adapted to swing with respect to the shaft 24 in a plane coincident to the axis thereof. Adjacent its lower end, the arm 28 curves inwardly as at 30 and terminates in oppositely extending portions 31. A shield element 32 is arranged against the extensions 31, and a strip or plate 33 is arranged against the shield 32 opposite the extensions 31. Fastening elements 34 extend through the extensions 31 and strip 33 to secure these elements against opposite faces of the upper edge of the shield. It will be apparent that the shield may be formed of glass, celluloid, or any other suitable material preferably colored to reduce the passage of light rays therethrough.

The portion 20 of the casing is provided with a slot 35 which extends from its upper end downwardly at an angle toward one end of the casing, forming approximately a section of a spiral. At its lower end, the slot communicates with a longitudinally extending slot 36 the closed end of which obviously is offset from the lower end of the slot 35. It will be apparent that the width of the slot 35 is slightly greater than the width of the arm 28, while the width of the slot 36 is slightly greater than the thickness of the arm 28 whereby the arm is freely movable through the slots 35 and 36.

Means are provided for tending to turn the shaft 24 to swing the shield 32 upwardly to the dotted line position shown in Figure 1. For this purpose, each end portion of the shaft on opposite sides of the arm 28 is surrounded by a torsion coil spring 37. Each spring has its ends respectively connected to the shaft and to the casing, and in the present instance these elements are shown as being provided respectively with eyes 38 and 39 to which the ends of the spring are connected.

The operation of the device is as follows:

As previously stated, the torsion springs 37 tend to turn the shaft 24 in a counter-clockwise direction, as viewed in Figure 3 whereby the shield 32 has a normal bias to the inoperative dotted line position in Figure 1. While two of the springs 37 have been illustrated it will be apparent that only one of the springs need be employed, and it also will be apparent that any known equivalent for the springs may be used if desired.

Accordingly it will be apparent that the arm 28 normally projects through the slot 35 at the upper end thereof, the end of the slot referred to acting as means for limiting the turning movement of the shaft 24. When it is desired to use the shield, the operator merely moves the shield 32 downwardly, thus turning the shaft 24 against the tension of the springs 37. During such turning movement, the arm 28 will follow the angularity of the slot 35, and accordingly the shield will swing toward the right in Figure 1 as it is moved downwardly to operative position. When the arm 28 reaches its lower limit of movement, the operator then swings the shield 32 to the left to arrange the arm 28 in the slot 36. The swinging action of the arm 28 is permitted by virtue of its pivotal connection with the shaft 24, as will be apparent, and when the arm 28 is arranged in the slot 36, the tosional force of the springs exerted upon the shaft 24 holds the arm 28 in firm frictional engagement with the upper edge of the slot 36. This frictional engagement resists any tendency of the arm 28 to swing under the influence of movements of the vehicle while being driven, and accordingly the shield 32 will remain in operative position.

When it is desired to return the shield to inoperative position, it merely is necessary for the operator to press against the left hand edge of the shield 32, as viewed in Figure 1, whereupon the arm 28 will be moved longitudinally with respect to the casing, and thus into alinement with the lower end of the slot 35. Upon being then released the springs 37 will revolve the shaft 24 to swing the arm 28 upwardly until it reaches the upper end of the slot 35 at which point the movement of the arm 28 will be arrested and it will be held indefinitely in the inoperative position shown in dotted lines in Figure 1. It will be apparent that the normal biasing of the shield to inoperative position holds the shield in such position indefinitely, and thus the shield is prevented from "creeping" downwardly into the line of vision of the operator when its use is not desired.

It will be obvious that the device is extremely simple in construction and thus may be cheaply manufactured. The operation of the device is easily carried out with little exertion on the part of the operator and the shield will remain in either position indefinitely without the use of any fastening or latching means of any kind.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A glare shield comprising a shield element, a member connected at one end to said shield element, rotatable means supporting the other end of said member whereby said shield element is adapted to swing from a lower operative position to an upper inoperative position, means normally tending to move said shield element to inoperative position, said member being mounted to swing in the plane of the axis of said supporting means, and holding means having a portion arranged parallel to the axis of said supporting means and beneath which said member is adapted to be moved to hold the shield element in operative position.

2. A glare shield comprising a shield element, a member connected at one end to said shield element, a substantially horizontal rotatable shaft, means pivotally connecting the other end of said member to said shaft to swing on an axis at right angles to the axis of said shaft, said shield element being supported by said shaft to swing between a lower operative position and an upper inoperative position, means normally tending to move said shield element to inoperative position, and holding means having a portion arranged parallel to the axis of said shaft and beneath which said member is adapted to be moved to hold the shield element in operative position.

3. A glare shield comprising a shield element, an arm connected at one end to said shield element, a support, a horizontal shaft rotatable in said support and fixed against longitudinal movement with respect thereto, means pivotally connecting the other end of said arm to said shaft to swing on an axis at right angles to the axis of said shaft, said shield element being rotatable with said shaft to swing between a lower operative position and an upper inoperative position, means normally tending to move said shield element to inoperative position, and holding means having a portion arranged parallel to the axis of said shaft and beneath which said arm is adapted to be moved to hold the shield element in operative position.

4. A glare shield comprising a shield element, an arm connected at one end to said shield element, a casing, a substantially horizontal rotatable shaft carried by said casing and fixed against longitudinal movement with respect thereto, means pivotally connecting the other end of said arm to said shaft to swing on an axis at right angles to the axis of the shaft, said shield element being supported by said shaft to swing between a lower operative position and an upper inoperative position, means normally tending to move said shield element to inoperative position, and holding means forming a part of said casing and arranged parallel to the axis of said shaft to receive said arm therebeneath to hold the shield element in operative position.

5. A glare shield comprising a shield element, an arm connected at one end to said shield element, a casing, a substantially horizontal rotatable shaft carried by said casing and fixed against longitudinal movement with respect thereto, means pivotally connecting the other end of said arm to said shaft to swing on an axis at right angles to the axis of the shaft, said shield element being supported by said shaft to swing between a lower operative position and an upper inoperative position, and means normally tending to move said shield element to inoperative position, said casing having an open portion through which said arm is adapted to move upon rotation of said shaft, said open portion having its lower end substantially horizontally arranged to receive said arm and hold said shield element in operative position.

6. A glare shield comprising a shield element, an arm connected at one end to said shield element, a casing, a substantially horizontal rotatable shaft carried by said casing and fixed against longitudinal movement with respect thereto, means pivotally connecting the other end of said arm to said shaft to swing on an axis at right angles to the axis of the shaft, said element being supported by said shaft to swing between a lower operative position and an upper inoperative position, and means normally tending to move said shield element to inoperative position, said casing being provided with a slot extending substantially spirally with respect to said shaft and having its upper end engageable with said arm to limit its movement in inoperative position, said casing being further provided with a horizontal slot communicating with the lower end of said first named slot and in which said arm is adapted to be arranged when said shield element is in operative position.

7. A glare shield comprising a shield element, an arm connected at one end to said shield element, a casing having a semi-cylindrical outer wall, a substantially horizontal rotatable shaft carried by said casing and fixed against longitudinal movement with respect thereto, said shaft being provided with a diametrical longitudinally elongated opening receiving the other end of said arm, a pivot pin connecting said arm to said shaft to swing on an axis at right angles to the axis of said shaft, said shield element being supported by said shaft to swing between a lower operative position and an upper inoperative position, and means normally tending to move said shield element to inoperative position, the outer wall of said casing being provided with a slot extending substantially spirally with respect to said shaft and having its upper end engageable with said arm to limit its movement in inoperative position, said casing being further provided with a horizontal slot communicating with the lower end of said first named slot and in which said arm is adapted to be arranged when said shield element is in operative position.

8. A glare shield comprising a shield element, an arm connected at one end to said shield element, a casing having a semi-cylindrical outer wall and parallel end walls provided with alined openings, a substantially horizontal shaft journalled at its ends in said openings, pins projecting through said shaft and engageable with said end walls to prevent longitudinal movement of said shaft, said shaft being provided with a diametrical longitudinally elongated opening receiving the other end of said arm, a pivot pin connecting said arm to said shaft to swing on an axis at right angles to the axis of said shaft, said shield element being supported by said shaft to swing between a lower operative position and an upper inoperative position, and a torsion spring surrounding said shaft with its ends connected respectively to said shaft and said casing and normally tending to move said shield element to inoperative position, the outer wall of said casing being provided with a slot extending substantially spirally with respect to said shaft and having its upper end engageable with said arm to limit its movement in inoperative position, said casing being further provided with a horizontal slot communicating with the lower end of said first named slot and in which said arm is adapted to be arranged when said shield element is in operative position.

In testimony whereof I affix my signature.

EUGENE A. FLAKE.